United States Patent [19]

Fauske

[11] Patent Number: 4,741,881

[45] Date of Patent: May 3, 1988

[54] CHEMICAL REACTOR

[75] Inventor: Hans K. Fauske, Hinsdale, Ill.

[73] Assignee: Westinghouse Electric Corp., Pittsburgh, Pa.

[21] Appl. No.: 1,303

[22] Filed: Jan. 8, 1987

[51] Int. Cl.$^4$ ............... G05B 23/12; G05B 9/00; F16K 17/40

[52] U.S. Cl. ............... 422/112; 137/68.2; 137/797; 220/89 A; 422/113; 422/117; 422/119

[58] Field of Search ............... 422/112, 113, 117, 119, 422/198, 2; 137/68.2, 797; 165/40, 53, 54; 220/89 A

[56] References Cited

U.S. PATENT DOCUMENTS

| | | | |
|---|---|---|---|
| 3,297,412 | 1/1967 | Phillips et al. | 422/117 |
| 3,854,522 | 12/1974 | Didycz et al. | 137/797 |
| 4,288,404 | 9/1981 | Redikultsev et al. | 422/112 |
| 4,622,209 | 11/1986 | Nardi et al. | 422/112 |
| 4,627,962 | 12/1986 | Grasset et al. | 422/113 |

Primary Examiner—Barry S. Richman
Assistant Examiner—Joye L. Woodard
Attorney, Agent, or Firm—D. C. Abeles

[57] ABSTRACT

A chemical reactor vessel is provided with a plurality of tubes filled with a heat exchange fluid. The tubes are disposed in a heat exchange relationship with the reactor contents and are coupled via pressure sensitive rupture discs and a header to a reservoir. Upon overheating of the reactor contents, excess heat is absorbed by the heat exchange fluid which boils off at a predetermined vaporization temperature and vapor pressure to rupture the discs and thereby establish fluid communication between the tubes and a heat exchange fluid contained in the reservoir, and thereby maintaining the reactor contents at a preselected safe temperature.

9 Claims, 1 Drawing Sheet

CHEMICAL REACTOR

BACKGROUND OF THE INVENTION

1. Field of the Invention

The present invention relates generally to the field of chemical reactor vessels and more specifically to a reactor vessel provided with a system for automatically preventing runaway of exothermic reactions.

2. Description of the Prior Art

Throughout the chemical industry there are a wide variety of exothermic reactions which take place in closed reactor vessels. A number of conditions can lead to a runaway reaction and uncontrolled self-heating pressure build-up in the vessel. Examples of such conditions include loss of cooling or refrigeration, contamination of the reactor contents and overfilling with a critical reagent due to faulty instrumentation or human error.

To accommodate the potential for the runaway reaction, reactor vessels of the prior art are provided with some type of emergency relief system which must operate when a threshold pressure is reached. Typically the reactor is provided with a substantial vent line which exhausts into a fluid filled quenching tank through a quencher arm which is designed specifically for the reactor vessel and reaction involved. In the overpressure condition of a runaway reaction a rupture disc releases the flashing flow through the vent line to the quenching tank. The required size of the vent line is strongly dependent upon the selected upset condition and the self-heat or energy release rate of the particular reaction which is generally not known. Sophisticated analysis and research are therefore required to even approximate a proper design.

When the relief vents of the prior art open a frothy mixture of liquid and gas is discharged which in the extreme may involve the entire contents of the reactor vessel. As a result, for a given size relief vent, liquid being discharged fills a portion of the vent and effectively reduces the cross-section available for the venting of vapor. Because less vapor than was initially assumed can be vented per unit time, the pressure in the reactor vessel can continue to rise, potentially above the design limits. Further, because of this two phase flow, the mass of material being discharged is substantially greater than would be assumed for an all vapor flow. These factors in turn require large, elaborate and expensive receiving systems which are ineffective for low vapor pressure systems. Also for high vapor pressure systems, the self-heat rate corresponding to relief set pressure becomes very large relative to process conditions.

SUMMARY OF THE INVENTION

Briefly, the present invention is a chemical reactor vessel which is provided with a plurality of emergency relief tubes filled with a heat exchange fluid and disposed in a heat exchanging relationship with the reactor vessel contents. Each of the tubes are coupled via rupture discs and a header to a fluid reservoir. Should the exothermic reaction within the vessel run out of normal control, heat is transferred to the fluid in the tubes increasing the internal pressure. When the pressure within the tubes reaches a preselected level the rupture discs open and vapor bubbles in the heat exchange fluid rise to the reservoir, condensing in the cooler fluid which refluxes into the tubes. The temperature of the contents of the reactor vessel is thereby maintained at the boiling point of the heat exchange fluid and the reaction is prevented from running away. The necessity of venting and quenching the reactor contents is thus avoided.

BRIEF DESCRIPTION OF THE DRAWINGS

The present invention will become better understood from the following detailed description of exemplary embodiments taken in conjunction with the various views of the appended drawings wherein.

DESCRIPTION OF PREFERRED EMBODIMENTS

Figure 1:
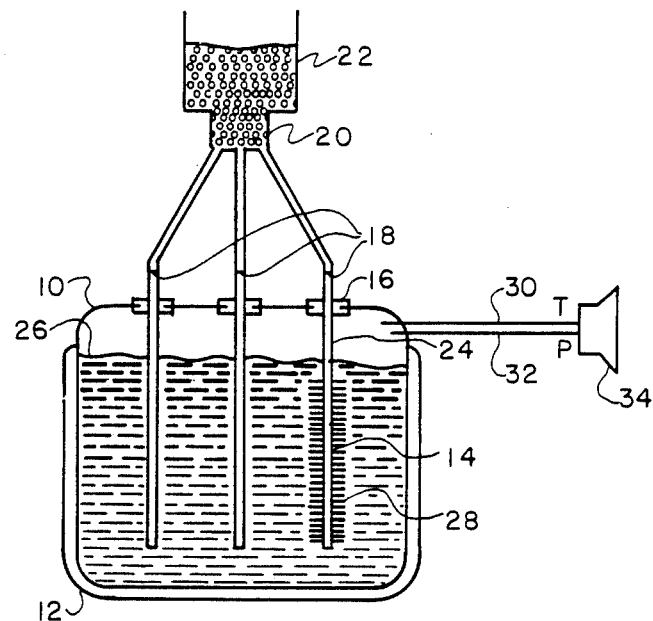
FIG. 1 is a cross-sectional view of a reactor vessel constructed in accordance with one embodiment of the present invention.

Turning now to FIG. 1 there is shown a typical closed reactor vessel 10 which is provided with a conventional heating and cooling jacket 12 and contains a quantity of reactants which at some point produce an exothermic reaction. In this illustrated embodiment of the invention a plurality of emergency relief tubes 14 are disposed through the reactor vessel through pressure fittings 16. Each tube 14 is provided with a rupture disc 18 designed to open when the pressure within the tubes 14 reaches a preselected value. The tubes 14 are in communication with a common header 20 and a quenching fluid reservoir 22. That portion of the tubes 4 within the reactor vessel 10 are filled with a heat exchange fluid having a predetermined vaporization temperature to a level 24 which is above the level 26 of the reactor contents. The tubes 14 are formed of a material which is thermally conductive and may be provided with thermally conductive fins 28 to enhance the heat transfer from the reactor contents to the heat exchange fluid. The reactor vessel may further be provided with sensors 30 and 32 to measure the internal temperature and pressure respectively of the reactor vessel 10, and activate an alarm 34 when preselected conditions are exceeded.

Should the exothermic reaction within the reactor vessel 10 experience a runaway condition, if not controlled, internal pressure beyond the reactor vessel 10 design limits could be produced. When the reactor begins to runaway, heat is transferred to the heat exchange fluid in the emergency relief tubes 14 and the fluid begins to vaporize. The vapor increases the pressure within the tubes 14 until the rupture discs 18 open. The vapor bubbles then rise to the reservoir 22, condensing in the cooler fluid which refluxes into the emergency relief tubes 14 thus continuing to cool the reactants in the reactor vessel 10. By maintaining the temperature of the reactants at the boiling point of the heat exchange fluid the reaction is prevented from running away. The internal pressure of the reactor vessel 10 is maintained within the design limits until any necessary operator action in response to the alarm 34.

Figure 2:
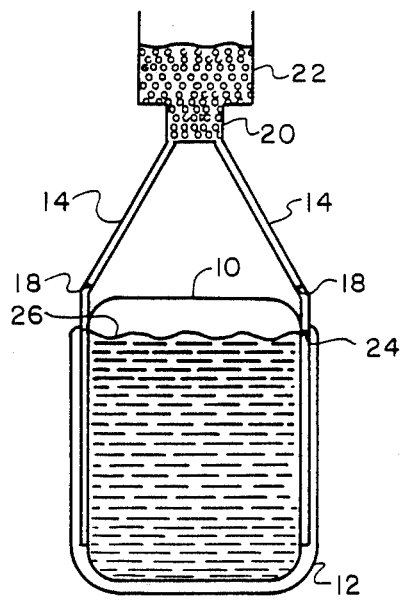
FIG. 2 is a cross-sectional view of a reactor vessel in accordance with an alternative embodiment of the present invention.

FIG. 2 is a cross-sectional illustration of an alternative embodiment of the present invention useful in situations wherein it is undesirable or impossible for the emergency relief tubes to penetrate the reactor vessel. The elements of FIG. 2 common to those shown in FIG. 1 are labeled with like reference characters. Whether disposed within the reactor vessel 10 as shown in FIG. 1 or externally as in FIG. 2 the emergency relief tubes 14 are in a heat exchanging relationship with the reactor contents and operate in the same manner as described above to passively control the temperature of the reactants and prevent reaction runaway.

From the preceding description it will be seen that the applicant has provided a new and improved chemical reactor vessel wherein reaction runaway is passively controlled such that the necessity of venting and quenching potentially dangerous reactants is obviated. Since certain changes in the above-described construction will occur to those skilled in the art without departure from the scope of the invention it is intended that all material set forth in the description or shown in the appended drawings shall be interpreted as illustrative and not in a limiting sense. Having described what is new and novel and desired to secure by Letters Patent,

What is claimed is:

1. A chemical reactor, comprising, in combination, a chemical reactor vessel for receiving a quantity of chemical reactants, a quenching reservoir filled in use with a supply of heat exchange fluid disposed within its interior, at least one thermally conductive emergency relief tube having a reactor end portion disposed in heat transfer relation with said chemical reactants when said vessel is in use, a quenching reservoir end portion joined to and in fluid communication with said interior of said reservoir, and an intermediate tube portion extending between said reservoir and reactor end portions, said reactor end portion of said relief tube being filled in use to a pre-selected level with a vaporizable heat exchange fluid having a predetermined vaporization temperature and vapor pressure, said reservoir being constructed and arranged so as to normally bias said heat exchange fluid in said reservoir for flow within said relief tube from said reservoir end to said reactor end portion of said tube, and pressure responsive flow control means disposed in said intermediate portion of said relief tube, said flow control means being movable from a closed position for preventing fluid flow between said reactor and said reservoir ends of said relief tube to an open position permitting substantial fluid flow between said reservoir and reactor ends of said relief tube, said pressure responsive flow control means being movable from said closed position to said open position in response to attainment by said heat exchange fluid in said reactor end portion of said tube of a predetermined vapor pressure indicative of a potential runaway reaction in said vessel, whereby, when said predetermined vapor pressure is reached, said flow control means is opened and remains open so that said heat exchange fluid in said reactor end portion of said tube may vaporize and pass through said intermediate and reservoir end tube portions and into said reservoir, and said reservoir fluid may pass through said reservoir end and intermediate tube portions and into said reactor end portion of said tube to provide additional heat absorption capacity within said reactor vessel.

2. A chemical reactor as defined in claim 1 wherein said reactor end portion of said relief tube is positioned within the interior of said reactor vessel so as to be in direct heat transfer relation with said reactants.

3. A chemical reactor as defined in claim 1 wherein said reactor end portion of said relief tube is positioned so as to be in contact with an external sidewall portion of said reactor vessel, and thereby to be in indirect heat transfer relation with said reactants.

4. A chemical reactor as defined in claim 1 wherein said at least one thermally conductive emergency relief tube constitutes a plurality of emergency relief tubes.

5. A chemical reactor as defined in claim 2 wherein said at least one thermally conductive emergency relief tube constitutes a plurality of emergency relief tubes.

6. A chemical reactor as defined in claim 2 wherein said at least one thermally conductive emergency relief tube includes means providing an increased heat transfer surface area on an exterior surface of said reactor end portion of said tube so as increase the heat transfer rate between the reactor vessel contents and the emergency relief tube.

7. A chemical reactor as defined in claim 1 wherein said flow control means comprises a rupture disk placed within said relief tube.

8. A chemical reactor as defined in claim 2 wherein said flow control means comprises a rupture disk placed within said relief tube.

9. A chemical reactor as defined in claim 1 which additionally includes means for measuring the pressure within said reactor vessel and alarm means operative in response to a measurement of elevated pressure in said reactor vessel.

* * * * *